United States Patent [19]

Kowalewski et al.

[11] Patent Number: 4,646,276

[45] Date of Patent: Feb. 24, 1987

[54] ACOUSTIC FISH BEHAVIORAL CONTROL DEVICE

[76] Inventors: Janusz J. Kowalewski, 3607 Lorca Crescent, Mississauga, Ontario, Canada, L5N 2J3; Jerry W. Forest, 53 Hamptonbrook Drive, Etobicoke, Ontario, Canada, M9P 1A2; Alan E. Christie, 37 Quincy Crescent, Willowdale, Ontario, Canada, M2J 1C5; Paul H. Patrick, 6345 Bell School Line, Milton, Ontario, Canada, L9T 2Y1

[21] Appl. No.: 848,752

[22] Filed: Apr. 7, 1986

[51] Int. Cl.$^4$ ............................................. G10K 1/00
[52] U.S. Cl. ..................................... 367/139; 367/142
[58] Field of Search ........................ 367/139, 142, 143

[56] References Cited

U.S. PATENT DOCUMENTS

| | | |
|---|---|---|
| 2,757,475 | 8/1956 | Pankove . |
| 2,977,705 | 4/1961 | Busnel . |
| 3,105,161 | 9/1963 | Harris . |
| 3,105,233 | 9/1963 | D'Amore et al. . |
| 3,194,207 | 7/1965 | Dunne ................................... 367/142 |
| 3,229,404 | 1/1966 | Abrahamsen et al. .............. 367/142 |
| 3,307,285 | 3/1967 | Wells .................................... 367/139 |
| 3,317,889 | 5/1967 | Barrand ............................... 367/139 |
| 3,333,236 | 7/1967 | Schloss . |
| 3,414,873 | 12/1968 | Richard et al. ...................... 367/139 |
| 3,416,254 | 12/1968 | Bornzin . |
| 3,458,855 | 7/1969 | Wallen ................................ 367/142 |
| 3,524,276 | 8/1970 | Thomas et al. . |
| 3,680,245 | 8/1972 | Brooks . |
| 3,686,656 | 8/1972 | Richards ............................. 367/142 |
| 4,282,588 | 8/1981 | Chanson et al. . |
| 4,387,451 | 6/1983 | Wilcox ................................ 367/142 |
| 4,400,804 | 8/1983 | Konrad ............................... 367/142 |
| 4,471,552 | 9/1984 | McIntosh et al. . |

OTHER PUBLICATIONS

G. T. Haymes, et al, Alternative Fish Protective Techniques, ESEERCO EP 83-12 (1984 and 1985).
J. H. S. Blaxter, et al, (1981), *J. Mar. Biol. Assoc. U.K.*, 61:851–869; 61:871–879.
A. L. Schwarz, et al, (1984), *Can. J. Fish. Aquat. Sci.*, 41:1183–1192.
J. R. Brett, et al, (1958), *Fish. Res. Bd. Can. Bull.*, No. 117, pp. 7 to 13.
C. H. Hocutt, (1980), Behavioural Barriers and Guidance Systems, pp. 183–205 in C. H. Hocutt, et al (Eds), *Power Plants: Effects on Fish and Shellfish Behaviour*, Academic Press, N.Y.
E. J. Smith, et al, (1984), *North Amer. J. Fish. Manag.*, 4:300–307.
W. N. Tavolga (1980), pp. 102–123, in J. E. Bardach, et al, (Eds), Fish Behaviour and Its Use in the Capture and Culture of Fishes, *Proc. Conf. Physiol. and Beh. Manipulation of Food Fish as Prod. and Man. Tools*, Bellagio, Italy, 1977.
V. J. Schuler, et al, (1975), *J. Environ. Eng. Div.*, AECE Vol. 10:897–910.
J. D. Richard (1968), *J. Fish Res. Bd. Can.* 25:1441–1452.
Y. G. Mussalli (1984), EPRI CS-3644, Advanced Intake Technologies Study, pp. 2–23 and A–35 to 37.
E. P. Taft (1986), EPRI, Assessment of Downstream Migrant Fish Protection Technologies for Hydroelectric Application, pp. 4–39 to 45.

*Primary Examiner*—Richard A. Farley
*Attorney, Agent, or Firm*—Ridout & Maybee

[57] ABSTRACT

An acoustic device for eliciting either attraction or repulsion behavioral responses in fish comprises a water tight enclosure having a radiating surface rigidly supported in one end thereof. Drive means for the radiating surface are provided with the capability of causing the radiating surface to vibrate at its resonant frequencies so that an acoustic signal is generated capable of a peak sound pressure level of at least 0.5 kPa (0 to peak) at a distance of 3 meters from the radiating surface. The signal generated has one fundamental frequency component in the range 20 to 1000 Hz and a plurality of resonant and harmonic frequencies associated with said fundamental frequency. The drive means, radiating surface and enclosure coact to generate an acoustic signal having characteristics such as resonant frequencies, peak pressures and temporal patterns which may be selectively optimized to produce the desired behavioral response.

18 Claims, 13 Drawing Figures

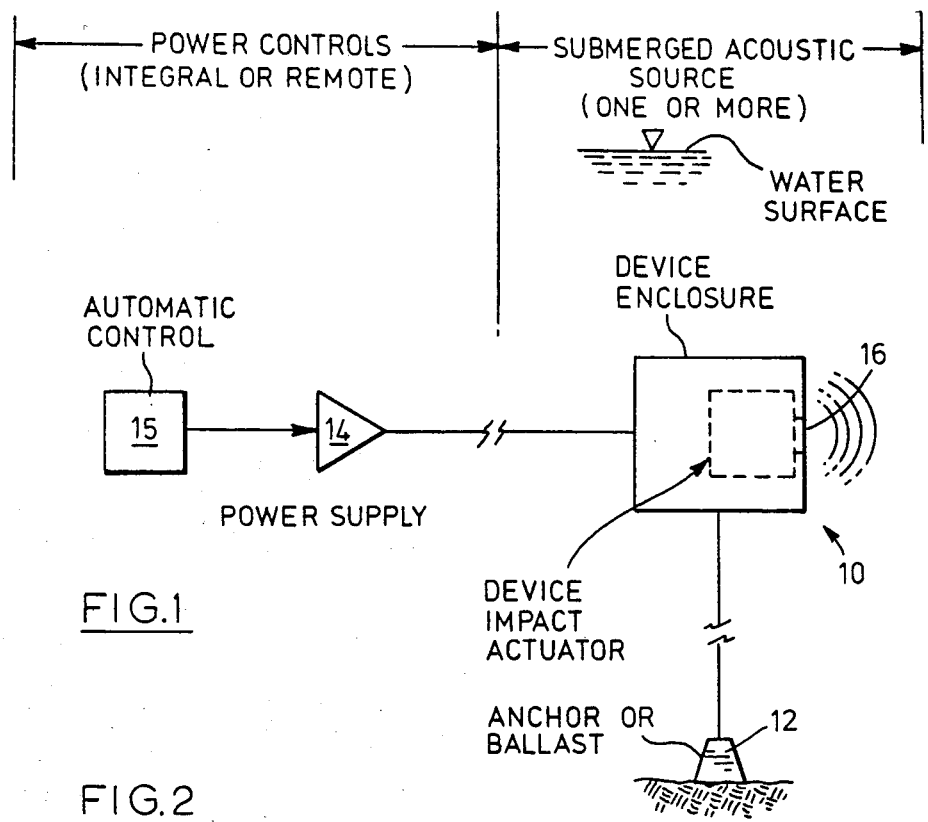
FIG.1
FIG.2
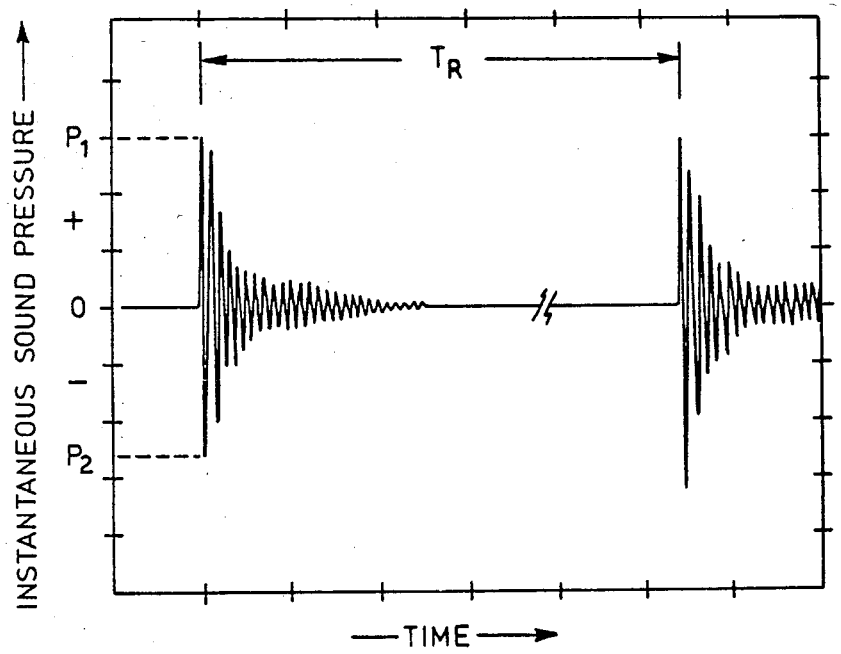

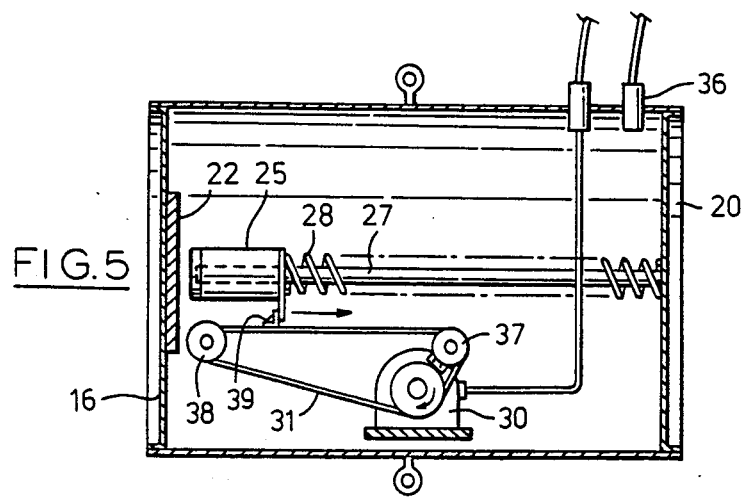
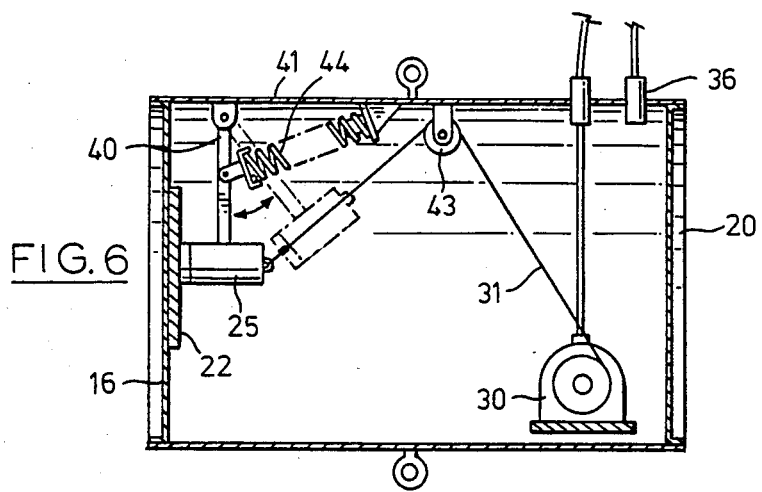
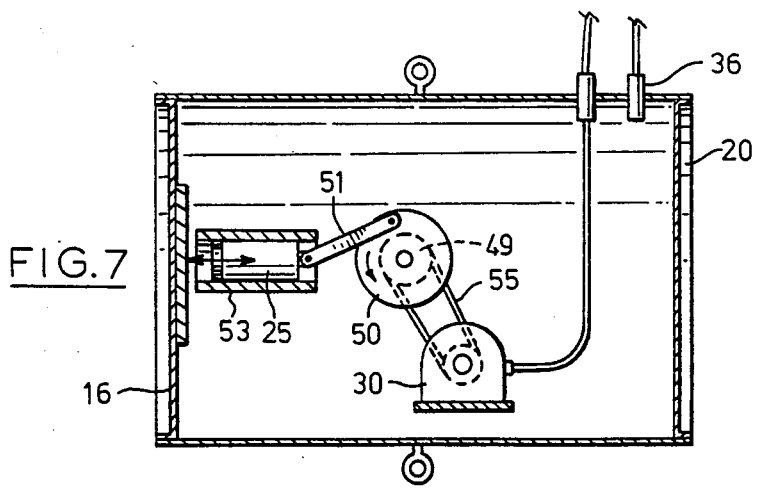

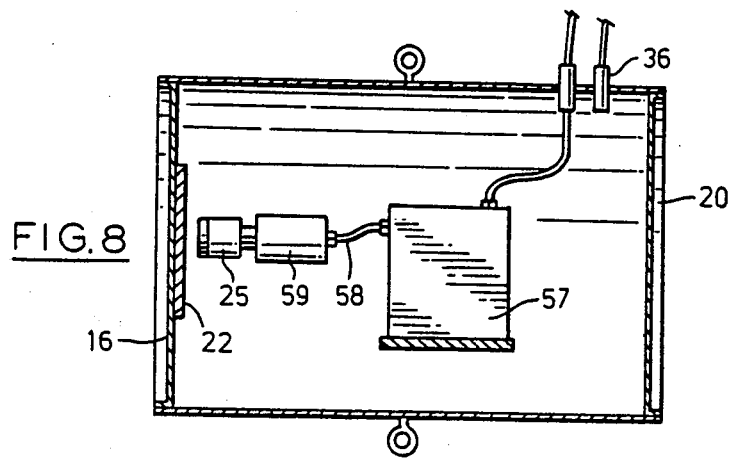
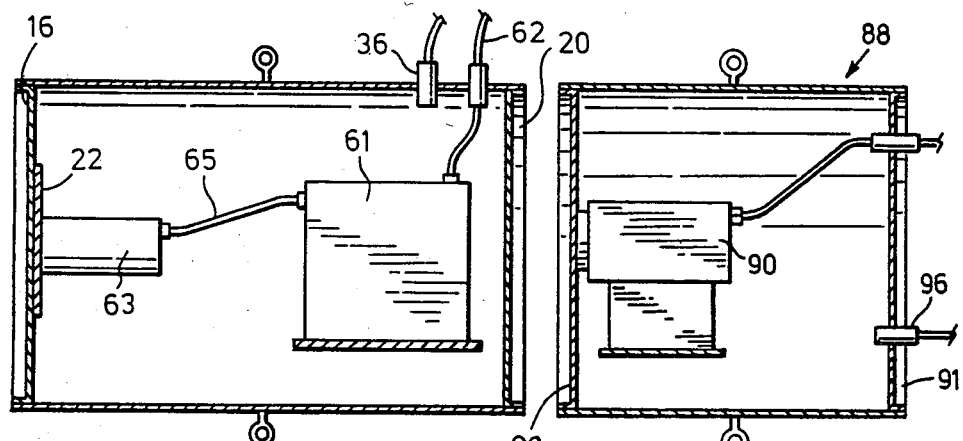
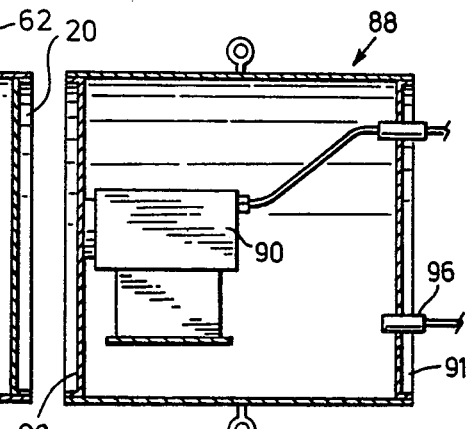
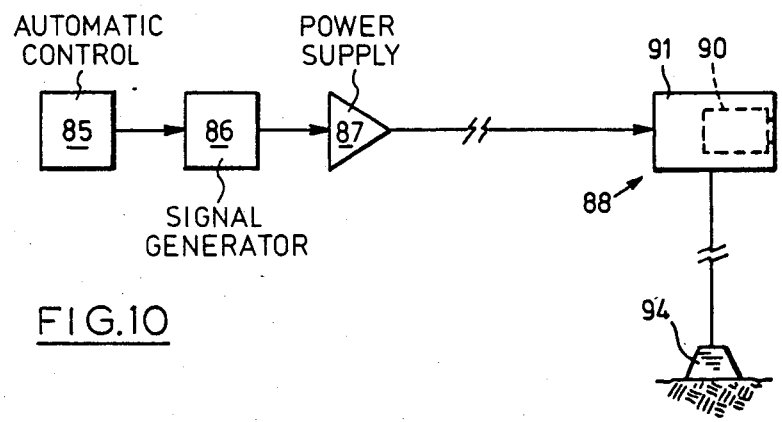

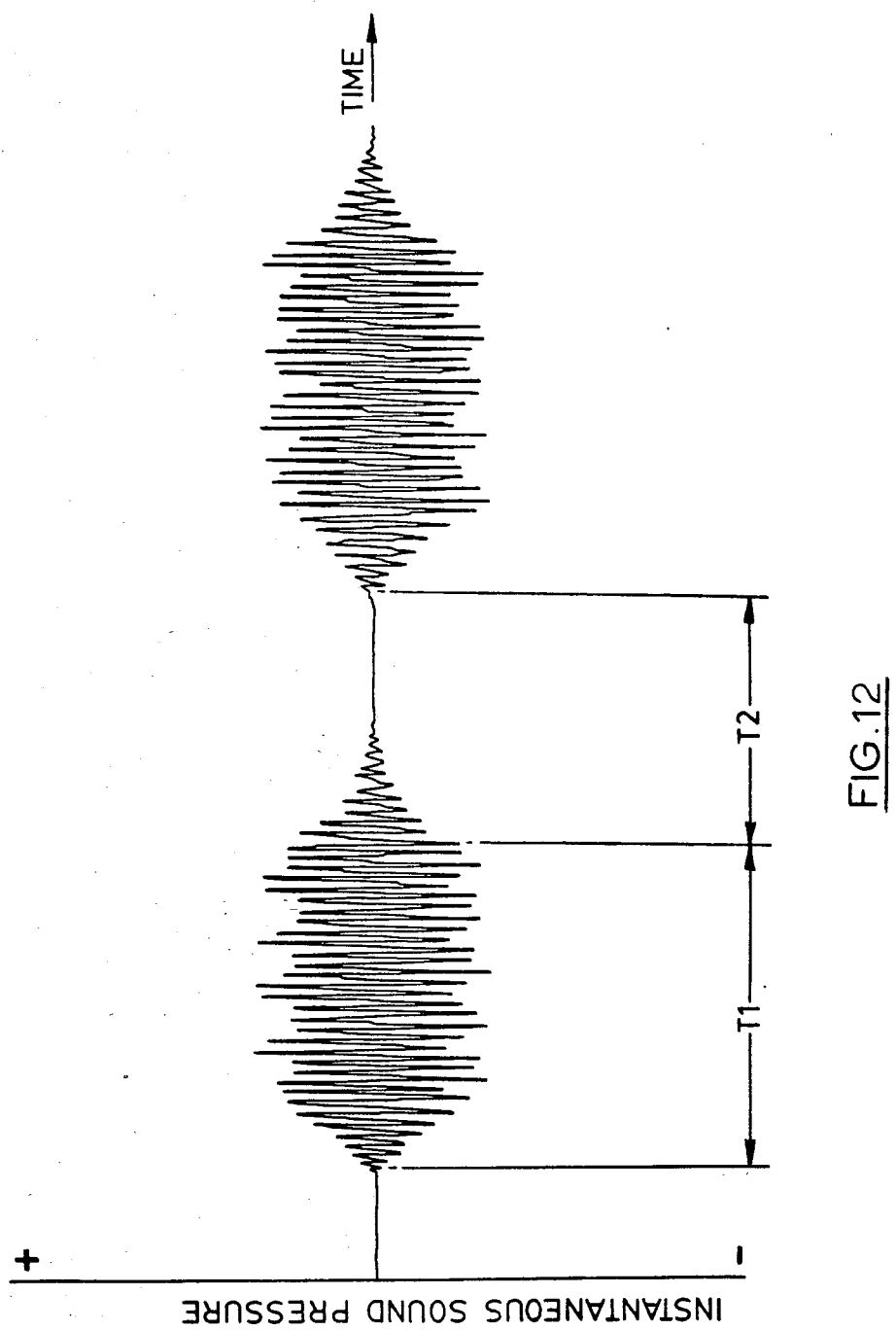

ACOUSTIC FISH BEHAVIORAL CONTROL DEVICE

The present invention relates to a device for eliciting a behavioural response in fish by means of sound. The device provides a non-lethal stimulus for fish and may be used to attract or repel fish.

The use of the invention as a management tool for repelling fish has application at industrial and electric generating station intakes. For the purpose of attracting fish, the invention may be useful in the commercial fishing industry.

Sound travels approximately 4.8 times faster in water than in air and consists of two components, namely a pressure wave and a particle velocity associated with the sinusoidal sound wave pattern. Both of these components are produced by the invention and can be perceived by the acoustical-lateralis system of a wide variety of fish.

Sound is detected by fish using several mechanisms which may include the inner ear, swim bladder, lateral line and a skin sensory system. Of these, the swim bladder appears to be the most obvious and efficient sonic detector. Fish with swim bladders are expected to have a better hearing capability than those without. Furthermore, those species which have an auditory connection, e.g. Ostariophysi, from the swim bladder to the inner ear, probably have the most sensitive hearing. Sound sensitivity of fish with open versus closed swim bladders is largely unknown. The lateral line is believed to be primarily a low frequency sound detector.

Much research has been conducted on the range of tones fish can and cannot hear. However, there has been little research on the sound analyzing capabilities of fish, and how fish will respond to various frequencies and amplitudes of sound. A review of the literature suggests that acoustical barriers have been generally ineffective as fish deterrents or attractants (Moore, H. L. and Neumann, H. W. (1956 ). The Effects of Sound Waves on Young Salmon, *U.S. Dept. Int. Fish and Wildlife Service, Special Science Report Fish,* 172:1-19; Brett, J. R. and Alderdice, D. F. (1958) Research on Guiding Young Salmon at Two British Columbia Stations, *Fish. Res. Bd. Can. Bull.* No. 117, 75 pp.; Ray, S. S., Snipes, R. L., and Tomjanovich, P. A. (1976) A State-of-the-Art Report on Intake Technologies, *Tennessee Valley Authority Research Report,* 75 pp.; Hocutt, C. H. (1980) Behavioural Barriers and Guidance Systems, p. 183-205, C. H. Hocutt, J. R. Stauffer, J. Edinger, L. Hall and R. Morgan (Eds), *Power Plants: Effects on Fish and Shellfish Behaviour,* Academic Press, New York; Smith, E. J. and J. F. Anderson (1984) Attempts to Alleviate Fish Losses from Allegheny Reservoir, Pennsylvania and New York, Using Acoustics, *North Amer. J. Fish. Manag.* 4:300-307). Some of the inconclusive results of these studies were attributed to a species specific response to sound. Fish which reside in an open water or pelagic habitat probably do not respond to the same frequencies of sound as fish which are demersal or bottom dwelling. Anatomical studies indicate considerable variability in the structural features of the auditory systems in various fish species.

With the present invention a species specific response to sound can be exploited since devices in accordance with the invention produce one or several fundamental frequencies ranging from 20 to 1000 Hz. Much of the prior work involving the use of sound as a fish deterrent can be criticized for several reasons. For example, many experimental designs for acoustic devices have involved equipment that clearly does not match the hearing abilities of most fish species. Tavolga (Tavolga, W. N. (1980) Hearing and Sound Production in Fishes Related to Fisheries Management, pp. 102-123, J. E. Bardach, J. J. Magnuson, R. C. May and J. M. Reinhart (Eds), Fish Behaviour and Its Use in the Capture and Culture of Fishes, *Proc. Conf. Physiol. and Beh. Manipulation of Food Fish as Prod. and Man. Tools,* Bellagio, Italy, 1977) gives an account of some studies where the sound projector used obviously was not capable of producing sound within the range to which fish would likely respond.

The greatest auditory sensitivity of non-ostariophysines appears to be generally within the 20-500 Hz range. This range is extended to higher frequencies for fish with weberian ossicles or similar apparatus (e.g. ostariophysines). Also, prior devices were not capable of producing a significant amplitude or shock wave component of the sound generated to elicit a behavioural response in most fish. The requirement of a shock wave to elicit a marked response in fish was first suggested by Schuler and Larson (Schuler, V. J. and L. E. Larson (1975) Improved Fish Protection at Intakes, *J. Environ. Eng. Div.,* AECE Vol. 10:887-910). The ineffectiveness of various taped sounds such as rock music to act as a deterrent for fish was attributed by Schuler and Larson to the absence of a shock or pressure wave component to the sound. The present device is capable of producing significant sound pressures at different fundamental frequencies ranging from 20 to 1000 Hz. It is felt that it is the combination of suitable frequency and amplitude of the sound generated by the device which elicits a desired behavioural response in the fish.

Low frequency sound has been used effectively to attract predators such as sharks (Nelson, D. R. and R. H. Johnson (1976) Some Recent Observations on Acoustic Attraction of Pacific Reef Sharks, pp. 229-239. A. Schuijf and A. D. Hawkins (Eds) *Sound Reception in Fish,* Elsevier Publications, Amsterdam) and other predatory fish (Richard, J. D. (1968) Fish Attraction Using Low Frequency Sound, *J. Fish Res. Bd. Can.* 25:1441-1452). In the latter study, attraction was attributed to the low frequency pulsed sounds which mimicked the hydrodynamic disturbances associated with active predation (i.e. a predator-prey response). The present device is capable of producing low frequency sound suitable for fish attraction.

Researchers have observed that fresh water alewife (*Alosa pseudoharengus*) and Atlantic herring (*Clupea harengus*), a related species, avoid a low frequency sound (Haymes, G. T. and P. H. Patrick (1984) Alternative Fish Protective Techniques; Pneumatic Guns and Rope Nets, *ESEERCO* EP 83-12; Haymes, G. T. and P. H. Patrick (1985) Alternative Fish Protective Techniques; Additional Studies with Pneumatic Air Deterrents, *ESEERCO* EP 83-12 extension; Blaxter, J. H. S., Gray, J. A. and E. J. Denton (1981) Sound and Startle Response in Herring Shoals, *J. Mar. Biol. Assoc. U.K.* 61:851-869; Blaxter, J. H. S. and D. E. Hoss (1981) Startle Response in Herring: The Effect of Sound Stimulus Frequency, Size of Fish and Selective Interference With the Acoustio-Lateralis System, *J. Mar. Biol. Assoc. U.K.*61:871-879). Schwarz and Greer (Schwarz, A. L. and G. L. Greer (1984) Responses of Herring, *Clupea harengus pallasi,* to Some Underwater Sounds, *Can. J. Fish. Aquat. Sci.* 41:1183-1192) observed that a low frequency, high amplitude sound which rapidly reached highest amplitude was more effective in eliciting avoidance responses in Pacific herring (*Clupea harengus pallasi*), than soft sounds of high frequency which increased in amplitude gradually.

Previous efforts to elicit an avoidance response in fish by generating a low frequency sound having a relatively high amplitude sound pressure have utilized pneumatic guns such as the type used in seismic oil exploration. These devices provide a sudden release of high pressure air to produce a low frequency, high amplitude sound. While the use of pneumatic guns to elicit an avoidance response in fish has been shown to be effective at least with respect to certain fish species (see Haymes, G. T. and Patrick, P. H. (1984) Alternative Fish Protective Techniques; Pneumatic Guns and Rope Nets, *ESEERCO* EP 83-12), these guns suffer from a number of limitations which make them generally unsuitable for use in a permanent installation. The pneumatic guns are relatively expensive and require frequent maintenance and lubrication. High pressure air hoses and a large compressor are required, both of which add to the cost and maintenance problems. Air leaks are a constant problem and are often difficult to locate when the system involves the use of an array of many guns. Also, the guns are limited in respect of the sound frequencies which can be generated by them. Since different species of fish may respond in the desired fashion to different frequencies of sound, it is important to be able to generate the appropriate sound signal in order to achieve the desired result.

The present invention addresses the various requirements for sound generation to elicit a behavioural response in fish by providing a simple, low cost, low maintenance device. The device of the invention relies on the use of a mechanical or an electromechanical means for driving a radiator or radiating surface at one of its resonant frequencies to generate an acoustic signal having the desired frequency and amplitude characteristics. In one form of the invention the radiator may be driven by a vibrator controlled by a signal generator so that a range of frequencies may be readily produced, and any such frequency may be produced at a relatively high sound pressure level for a desired period of time.

In another form of the invention the radiator is driven repetitively to produce a suitable acoustic signal impulse which is allowed to decay between repetitions. Each form of the invention may be used alone or in conjunction with the other form of the invention to achieve the desired behavioural response in targeted fish. Especially for the purpose of repelling fish, it is generally preferred to employ an array of devices of the invention about the area where fish are to be excluded in order to obtain the best results.

BRIEF SUMMARY OF THE INVENTION

The invention provides an acoustic device for eliciting a behavioural response in fish, comprising a water tight enclosure and a radiating surface rigidly supported about its perimeter in a wall of the enclosure. Drive means for the radiating surface are provided which are capable of causing the radiating surface to vibrate at a resonant frequency so that a suitable acoustic signal is generated under water. A suitable acoustic signal has a peak sound pressure level of at least 0.5 kPa (0 to peak) at a distance of 3 meters from the radiating surface and has a fundamental frequency component in the range 20 to 1000 Hz and a plurality of harmonic frequencies associated with said fundamental frequency.

BRIEF DESCRIPTION OF THE DRAWINGS

FIG. 1 is a schematic diagram of system employing one embodiment of the invention;

FIG. 2 is a graph of a typical acoustic signal generated by a device of FIG. 1, showing the signal amplitude versus time;

FIGS. 4 to 9 are cross sectional schematic views of acoustic generators in accordance with one embodiment of the invention;

FIG. 10 is a schematic diagram of a system employing a second embodiment of the invention;

FIG. 11 is a cross sectional schematic view of an acoustic generator in accordance with a second embodiment of the invention;

FIG. 12 is a graph of a typical acoustic signal generated by a device of FIG. 10, showing the signal amplitude versus time.

As shown in FIG. 1, one embodiment of the invention comprises an acoustic generator 10 anchored in place underwater by means of an anchor 12 or other similar means and a power supply 14 coupled with an automatic control 15. The acoustic generator 10 comprises a water tight enclosure preferably filled with air or other low impedance medium. The enclosure is provided with a radiating surface 16 and means for actuating a mass to impact the radiating surface 16 so as to generate a sound. By virtue of the low impedance medium within the enclosure, a resonant acoustic signal may be produced under water by the generator 10. The generator 10 is designed to produce a peak sound pressure level of at least 0.5 kPa (0 to peak) at a distance of 3 meters from the radiating surface 16.

A typical amplitude profile of an acoustic signal generated in accordance with this embodiment of the invention as measured 3 meters from the radiating surface 16 is shown in FIG. 2. The peak pressure level $P_1$ for each impulse of sound generated is attained within the first or second oscillation from signal initiation. The sound pressure level then decays at a rate dependent on the overall damping of the system. The signal is regenerated at a time $T_R$ after the initial impact of the mass against the radiating surface 16. Both the time $T_R$ between signals as well as the amplitude of the signals generated is governed by the automatic control 15. That is, the control 15 governs the repetition rate of the mass impacting the radiating surface 16 and in the case of the embodiments of FIGS. 8 and 9, the force of those impacts within the parameters of the components.

Figure 3:
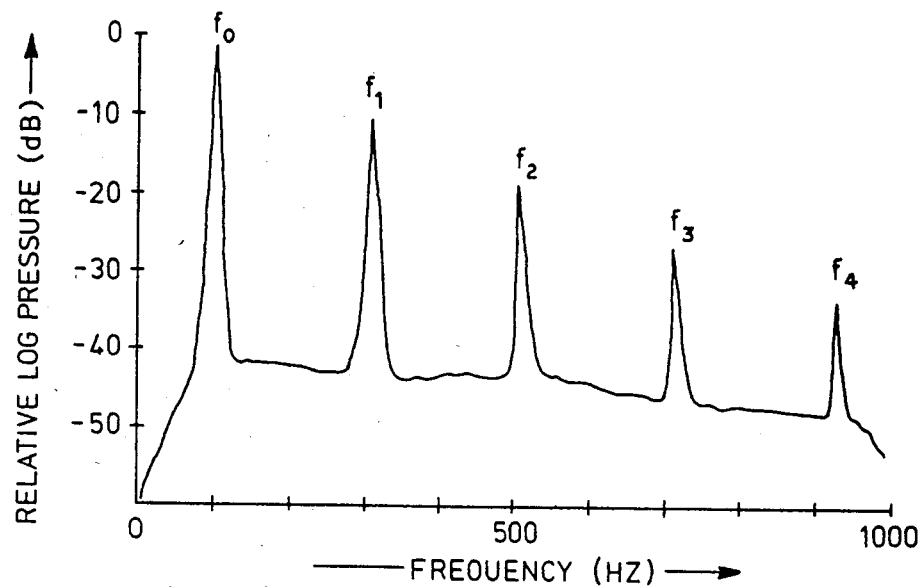
FIG. 3 is a typical sound pressure spectrum of the acoustic signal generated by a device of FIG. 1.

The frequency content of a typical underwater signal generated by the device 10 is shown in FIG. 3. The fundamental frequency $f_0$ is the frequency of the first natural mode of vibration of the dynamic system comprising the generator 10 and the surrounding water. The higher frequencies $f_1$, $f_2$, etc., shown in FIG. 3 are the natural modes of vibration of the system. In accordance with the invention, the fundamental frequency normally has the highest magnitude, however, the invention provides for considerable variability in the frequencies and the relative magnitudes of the acoustic signals generated. This variability is achieved by using any of a variety of materials between the impacting mass and the radiating surface 16 of the generator 10. Thus, the generator 10 may be tuned both within a range of frequencies and amplitudes. This feature is important to enable use of the generator 10 to elicit a desired behavioural response in a variety of fish species.

The acoustic signal generator 10 in accordance with this embodiment of the invention is illustrated in a number of variants in FIGS. 4–9. As seen in these figures, the generator 10 comprises a water tight enclosure 20 which may conveniently be cylindrical having a volume of about 220 liters. A radiating surface 16 is rigidly supported about its perimeter in a wall of the enclosure 20. Preferably, the radiating surface 16 is positioned in an end of the enclosure 20. By way of example, a typical construction of a generator 10 comprises an ⅛ inch thick steel radiating surface 16 in an end of a steel cylindrical enclosure 20. A strike plate 22 may be attached, for example, by welding, to the radiating surface 16 for receiving the impact from a mass 25. In this arrangement, the strike plate 22 serves to reinforce the radiating surface 16 and to spread the force load from the impacting mass 25. Clearly, there are a wide variety of combinations of surfaces 16 and plates 22 which may be used to generate acoustic signals having qualities which elicit a behavioral response in fish.

Figure 4:
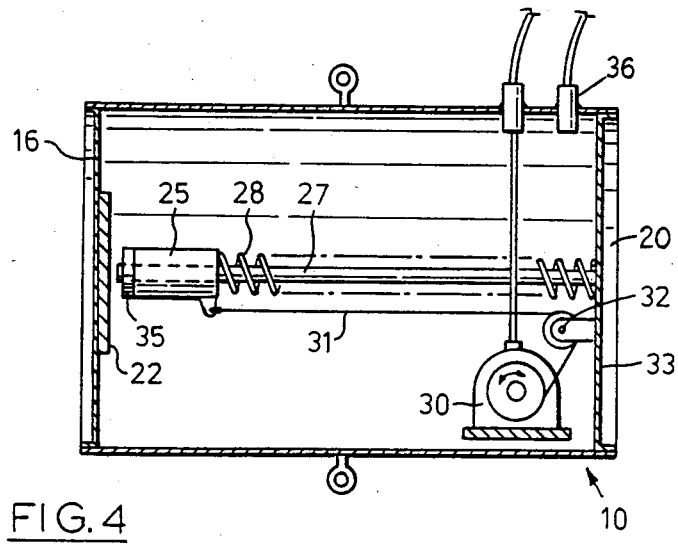

A drive means for the radiating surface 16 is provided in the device of FIG. 4 by a mass 25. The mass 25 is caused to move along a rail 27 to impact a strike plate 22 or the surface 16 directly under the influence of a spring 28. The mass 25 is drawn back from the strike plate 22 by a rotary actuator 30 having a clutch means for disengaging the actuator drive. The mass 25 is attached to the rotary actuator 30 by a cable or chain 31 which may pass over a pulley or sprocket 32 attached to the rear wall 33 of the enclosure 20. The actuator 30 causes the cable 31 to be reeled in thereby moving the mass 25 against the spring 28. When the desired spring tension is achieved, the clutch for the actuator 30 is disengaged to release the mass 25 and cable 31 under the influence of the stored energy of the spring 28. After the mass 25 impacts the strike plate 22, the procedure is repeated in accordance with the timing dictated by the automatic control 15.

In the case of a device having an enclosure 20 which is somewhat flexible or not sufficiently rigid to withstand the external water pressure to which it will be subjected, a pressurized gas or air supply 36 may be provided to the enclosure 20 to balance the external hydrostatic pressure. The pressurization of the enclosure 20 may be applied to any of the embodiments hereafter described.

The frequency characteristics of the sound generated by the device of FIG. 4 depends on the materials used. For example, the use of a pliable material, such as rubber, affixed to the impacting surface 35 of the mass 25 causes the number of frequencies excited to relatively high levels to be limited to the first few natural frequencies. Conversely if a hard impacting mass 25 strikes a plate 22, many of the natural frequencies will be excited to relatively high levels.

FIG. 5 shows a variation of the device 10 of FIG. 4 wherein the cable 31 is provided in a continuous loop about two pulleys 37 and 38. The mass 25 is engaged by means of a dog or hook 39 mounted on the cable 31. The mass 25 is drawn back against the spring 28 until the hook 39 is caused to disengage the mass 25 by traveling around the pulley 37. In this case, of course, clutch means are not required for the actuator 30.

In FIG. 6, the mass 25 is attached to an arm 40 which is in turn pivotally attached to an upper surface 41 of the enclosure 20. As with the embodient shown in FIG. 4, the mass 25 is attached to a rotary actuator 30 by a cable 31 which passes over a pulley 43 also attached to the upper surface 41. A spring 44 may also be employed to provide additional energy to the mass 25 as it moves against the strike plate 22 or the radiating surface 16.

The embodiment shown in FIG. 7 provides the impacting mass 25 in conjunction with a flywheel 49. The mass 25 is pivotally connected to a wheel 50 by an arm 51, and the mass 25 moves toward and away from the strike plate 22 or the radiating surface 16 along a rail 27 as shown in FIG. 4 or other guide means such as a cylinder 53. The rotary actuator 30 drives the flywheel 49 by means of a cable or chain 55. A single revolution clutch is provided between the flywheel 49 and the wheel 50 for rotating the wheel 50. The single revolution clutch is activated by the automatic control 15. Engagement of the clutch causes the mass 25 to impact the strike plate 22 with a force transferred from the energy stored in the flywheel 50.

FIG. 8 shows a device 10 of the invention wherein a pneumatic tank or accumulator 57 is charged with compressed air or other gas to provide a desired amount of stored energy. A control valve (not shown) associated with the accumulator 57 is governed by the automatic control 15 (FIG. 1) to release the pressurized gas through a hose 58 from the accumulator 57 to a pneumatic actuator 59. The actuator 59 causes the mass 25 to impact the strike plate 22 or the radiating surface 16. The actuator 59 may be, for example, a standard air cylinder with an internal spring return.

The arrangement shown in FIG. 8 is also suitable for an hydraulically operated device. Thus, an hydraulic accumulator 57 is charged with oil supplied under pressure from a pump. The control valve is governed by the automatic control 15 to release hydraulic pressure through the hose 58 to the hydraulic actuator 59. The mass 25 is caused to impact the plate 22 or the surface 16 and an internal spring return or similar means returns the mass 25 to its initial position in preparation for the cycle to repeat. Alternatively, a double acting hydraulic actuator 59 may be used, wherein the control valve applies hydraulic pressure in the opposite direction to cause the mass 25 to return to its initial position. The stored energy lost in producing the impact is then restored to the accumulator 57 from the hydraulic pump.

FIG. 9 shows an embodiment of the invention having one or more storage capacitors 61 charged to a desired energy level by an electric power supply provided through a cable 62. The electrical energy stored can be discharged through a magnetostrictive transducer 63 being connected to the capacitors 61 by a cable 65 and to the strike plate 22 or the radiating surface 16. The magnetostrictive transducer 63 comprises a magnetostrictive material over which is wound a coil of an electrical conductor. The transducer 63 is configured to produce rectilinear expansion of the mass 25 in a direction perpendicular to the surface of the plate 22. An additional inertia mass may be attached to the free end of the transducer 63 to improve the mechanical effect of the mass 25 impacting the strike plate 22.

Alternatively, the magnetostrictive transducer 63 may be rigidly supported to provide a small gap between it and the strike plate 22. In this configuration, the active end of the transducer, being that closest the plate 22, will impact the strike plate 22 when the transducer is energized.

Again referring to FIG. 9, the storage capacitors 61 may be used to energize a piezoelectrical transducer 63. This type of transducer comprises an array of piezoelectric elements housed within a protective container. The elements are configured to produce rectilinear expansion of the mass 25 perpendicular to the strike plate 22 or the radiating surface 16 thereby causing the mass 25 to impact the plate 22 or surface 16. Again an inertial mass may be added at the other end of the transducer 63 to improve the mechanical impact effect, and the transducer 63 may be spaced slightly away from the plate 22.

In the configurations of FIG. 9, clearly the mass 25 forms a part of either type of transducer 63 being used.

For fish repulsion or guiding applications such as at industrial water intakes, the device 10 may be located in a fixed, submerged position by suitable anchoring. The power supply 14 and automatic control 15 may be remotely located at a convenient place on shore. The device 10 is located in such a position as to prevent the movement of fish individuals or schools) into the intakes. To extend the area of influence, an array of devices 10 may be used. In this case, a common automatic control 15 may be used to control all the devices simultaneously.

For guiding or attracting applications, such as for commercial fishing, the device 10 may be towed submerged during operation using a suitable towing mechanism. The power supply 14 and automatic control 15 may be remotely located such as on a boat or floating platform.

Another embodiment of the invention is shown in FIGS. 10 and 11. As schematially shown in FIG. 10, this embodiment comprises a automatic control 85 which operates a signal generator 86. The signal generator 86 provides a discrete frequency, electrical signal to a power supply 87, the output from which is fed to a device 88 having a vibrator 90 mounted within an enclosure 91 for driving a radiating surface 92. The enclosure 91 serves the same purpose as the enclosure 20 discussed above, that is, it provides a waterproof container for the vibrator 90 and is an underwater acoustic radiator.

As shown in FIG. 11, the vibrator 90 is attached to a radiating surface 92 rigidly supported about its perimeter to the enclosure 91. The radiating surface 92 is coupled to a low impedance medium such as air within the enclosure 91, to allow the surface 92 to resonate when driven by the vibrator 90. By this arrangement acoustic energy may be efficiently transmitted into the water from the radiating surface 92 since cancellation of vibration from the interior side of the surface 92 is prevented. The radiating surface 92 may also be provided with a strike plate to reinforce the surface 92 such as shown in FIGS. 4-9, but generally, the variability inherent in the vibrator 90 to generate suitable signals means that a strike plate will not usually be needed.

For the purpose of repelling fish, the device 88 may produce a relatively long duration acoustic signal having a sound pressure level of at least 0.5 kPa (zero to peak) at about 3 meters distance from the radiating surface 92. This is accomplished by driving the surface 92 at one of its lower order resonant modes of vibration which are known to generate the largest amplitude displacement.

For attraction or guidance of fish, the sound pressure level generated by the device 88 does not need to be as high as for repulsion. The same device 88 may be used with various frequencies, including nonresonant frequencies, simply by adjusting the frequency of the signal generator 86.

Suitable vibrators 90 may be of any of a variety of known types, including magnetostrictive, electrodynamic, pneumatic, piezoelectric or hydraulic. The type of vibrator 90 used depends on the convenience in design, the power and frequency range desired for a particular application.

The dimensions and material of the enclosure 91 including the radiating surface 92 may vary depending on the frequencies and signal resonance characteristics required. Frequencies in the range 20 to 1000 Hz may generally be provided by use of a cylindrical steel drum enclosure 91 having a volume of about 220 liters.

As with the device 10 described above, the device 88 may be anchored in place by anchor means 94 (FIG. 10) or may be towed through the water. The automatic control 85, signal generator 86 and power supply 87 are preferably located out of the water remotely from the device 88. As with the device 10, the enclosure 91 may be pressurized to compensate for the surrounding static water pressure at the desired depth of submersion. Air pressure supply means 96 are provided to the enclosure 91 for this purpose.

The structure of the device 88 allows it to produce continuous, high sound pressure levels with considerable flexibility for shaping the characteristics of the sound. As shown in FIG. 12, the acoustic signal generated by the device 88 may be a series of bursts. In each burst the instantaneous sound pressure rises above ambient until a steady level of resonant oscillation is reached. This level is maintained for a duration $T_1$ and then reduced back to ambient until the next burst at interval $T_2$. These time sequences are governed by the automatic control 85. Preferably, the time $T_1$ should be long enough to establish full amplitude resonance of the acoustic signal.

When it is felt desirable to maintain resonance, the signal generator 86 and automatic control 85 adjust the frequency of the signal to allow for variations caused by changing environmental conditions or other factors. This adjustment may be accomplished using a microprocessor programmed, for example, to respond to a sensor providing amplitude feedback information.

Figure 13:
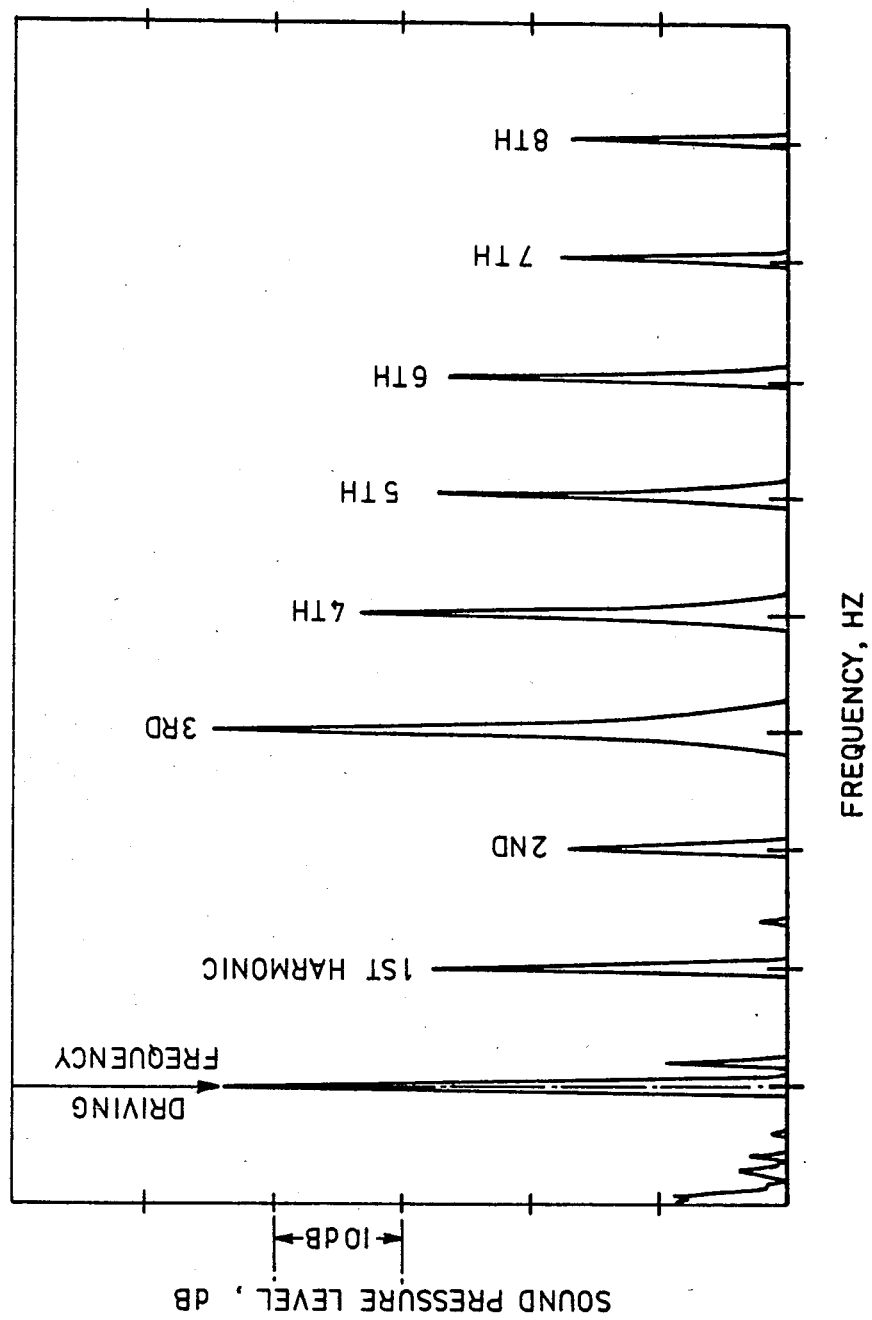
FIG. 13 is a typical sound pressure spectrum of the acoustic signal generated by a device of FIG. 10.

A typical frequency spectrum of the sound generated by the device 88 is shown in FIG. 13. The frequency spectrum is set to a series of fixed resonant modes of vibration which are selected by design for the intended purpose of the device 88.

This embodiment of the invention may be used alone or in conjunction with the impact devices 10 of the invention. The devices 88 may form a part of an array of devices 10 and 88 positioned about an intake or other structure from which fish are to be repelled. Importantly, the device 88 may be used to determine those sound characteristics which are most effective to either repel or attract fish species of interest. As with the device 10, the device 88 may be towed through the water for the purpose of attracting fish.

We claim:

1. An underwater acoustic device for eliciting a behavioural response in fish, comprising:
   a submersible acoustic water tight enclosure filled with a gas;
   a radiating surface rigidly supported about its perimeter in a wall of the enclosure;

drive means within the enclosure for the radiating surface which are capable of causing the radiating surface to vibrate at its resonant frequencies so that an acoustic signal is generated under water capable of a peak sound pressure level of at least 0.5 kPa (0 to peak) at a distance of 3 meters from the radiating surface, said signal having a fundamental frequency component in the range 20 to 1000 Hz and a plurality of resonant and harmonic frequencies associated with said fundamental frequency, the drive means, radiating surface and enclosure coacting to generate an acoustic signal having characteristics which may be selectively optimized to product the desired behavioural response.

2. A device as claimed in claim 1, further comprising an automatic control unit and a power supply for the drive means located remotely from the water tight enclosure.

3. A device as claimed in claim 2, further comprising a signal generator for the drive means, the signal generator being located remotely from the enclosure.

4. A device as claimed in claim 1, wherein the water tight enclosure is pressurized with gas to enhance the generation of sound and to balance the external static water pressure to which it is subjected.

5. A device as claimed in claim 1, further comprising a strike plate attached to the radiating surface for tuning the resulting acoustic signal and for receiving the force of the drive means.

6. A device as claimed in claim 1, wherein the drive means comprises:
an impacting mass;
means for guiding the mass to and from the radiating surface;
spring means for forcing the mass toward the radiating surface; and
a rotary actuator having a clutch, the actuator coacting with the mass to draw it from the radiating surface against the force of the spring, the clutch being operable to disengage the actuator thereby releasing the mass so that it may move along the guide means and strike the radiating surface.

7. A device as claimed in claim 6, wherein the rotary actuator drives an endless cable having means for engaging cooperative means on the mass so that the mass may be drawn away from the radiating surface and released to strike the surface under the influence of energy supplied by the spring means.

8. A device as claimed in claim 6, wherein the means for guiding the mass is an arm attached at one end to the mass and being pivotally attached at the opposite end to an upper surface of the enclosure.

9. A device as claimed in claim 1, wherein the drive means comprises:
an impacting mass;
an arm for guiding the mass to and from the radiating surface, said arm being attached at one end to the mass and being pivotally attached at the opposite end to an upper surface of the enclosure; and
a rotary actuator having a clutch, the actuator coacting with the mass or arm to draw the mass from the radiating surface against the force of gravity, the clutch being operable to disengage the actuator thereby releasing the mas so that it may strike the radiating surface.

10. A device as claimed in claim 1, wherein the drive means comprises:
an impacting mass;
means for guiding the mass to and from the radiating surface;
an arm pivotally connected at one end to the mass and pivotally connected at the other end to a wheel whereby rotation of the wheel causes the mass to move to and from the radiating surface thereby striking it;
a rotary actuator drivingly connected to a flywheel; and
a single revolution clutch being provided between the flywheel and wheel, the clutch being engaged to cause the wheel to rotate with a transfer of energy from the flywheel to the mass.

11. A device as claimed in claim 1, wherein the drive means comprises:
an impacting mass;
an hydraulic actuator connected to the mass for causing the mass to move toward and strike the radiating surface, the actuator having means for moving the mass away from the surface when the actuator is under low hydraulic pressure; and
an hydraulic accumulator connected to the actuator, the accumulator being charged with hydraulic fluid from a pump, the accumulator having a control valve for transferring pressure to the actuator to cause the mass to strike the surface.

12. A device as claimed in claim 1, wherein the drive means comprises:
an impacting mass;
a pneumatic actuator connected to the mass for causing the mass to move toward and strike the radiating surface, the actuator having means for moving the mass away from the surface when the actuator is under low pneumatic pressure; and
a pneumatic accumulator connected to the actuator, the accumulator being charged with a gas from a pump, the accumulator having a control valve for transferring pneumatic pressure to the actuator to cause the mass to strike the radiating surface.

13. A device as claimed in claim 1, wherein the drive means comprises:
a transducer having an impacting mass; and
at least one storage capacitor connected to the transducer and to an electric power source, said capacitor having means for discharging stored electrical energy to the transducer to cause the mass to impact the radiating surface.

14. A device as claimed in claim 13, wherein the transducer is magnetostrictive or piezoelectric.

15. A device as claimed in claim 13, wherein the transducer is affixed to the radiating surface.

16. A device as claimed in claim 13, wherein the transducer is spaced slightly from the radiating surface.

17. A device as claimed in claim 1, wherein the drive means comprises:
a vibrator attached to the radiating surface; and
a signal generator for the vibrator.

18. A device as claimed in claim 17, wherein the vibrator may be of the magnetostrictive, electrodynamic, pneumatic, piezoelectric or hydraulic type.

* * * * *